United States Patent
Huang

(10) Patent No.: US 8,305,364 B2
(45) Date of Patent: Nov. 6, 2012

(54) STYLUS FUNCTIONING AS JOYSTICK AND ELECTRONIC DEVICE UTILIZING THE SAME

(75) Inventor: Chih-Chien Huang, Taipei County (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 329 days.

(21) Appl. No.: 12/749,658

(22) Filed: Mar. 30, 2010

(65) Prior Publication Data

US 2011/0090180 A1 Apr. 21, 2011

(30) Foreign Application Priority Data

Oct. 21, 2009 (CN) .......................... 2009 1 0308579

(51) Int. Cl.
- *B41B 1/00* (2006.01)
- *G06F 3/033* (2006.01)
- *G06F 17/00* (2006.01)
- *G06F 19/00* (2011.01)
- *G09F 5/00* (2006.01)
- *A63F 9/24* (2006.01)
- *A63F 13/00* (2006.01)
- *G05B 15/00* (2006.01)

(52) U.S. Cl. ............. 345/179; 81/9.2; 345/161; 463/38; 700/85

(58) Field of Classification Search ........................ None
See application file for complete search history.

(56) References Cited

U.S. PATENT DOCUMENTS

| | | | | |
|---|---|---|---|---|
| 5,615,083 A * | 3/1997 | Burnett | ...................... | 361/679.1 |
| 5,883,690 A * | 3/1999 | Meyers et al. | ................ | 345/161 |
| 5,976,018 A * | 11/1999 | Druckman | ...................... | 463/47 |
| 7,728,814 B1 * | 6/2010 | Ansari et al. | .................. | 345/161 |
| 2002/0105503 A1 * | 8/2002 | Oueslati et al. | ............... | 345/173 |
| 2003/0076302 A1 * | 4/2003 | Langstraat | ..................... | 345/161 |
| 2004/0109285 A1 * | 6/2004 | Lee | .............................. | 361/683 |
| 2004/0155862 A1 * | 8/2004 | Higginson | .................... | 345/156 |
| 2005/0275623 A1 * | 12/2005 | Chadha | ......................... | 345/156 |

\* cited by examiner

*Primary Examiner* — Alexander S Beck
*Assistant Examiner* — Kirk Hermann
(74) *Attorney, Agent, or Firm* — Altis Law Group, Inc.

(57) ABSTRACT

A stylus is used in an electronic device. The electronic device includes a navigation key. The stylus includes a barrel, a tip portion; and a connecting assembly. The tip portion can be detachably attached to an end of the barrel. The connecting assembly includes a main post and four resisting arms, and connects to the other end of the barrel, and the resisting arms are rotatably seated on the tip portion. When the stylus is used as a joystick, the resisting arms are rotated about 90° to form a cross shape, the tip portion is attached to the main post, and the resisting arms latch to the navigation key. The present disclosure further discloses an electronic device using the stylus.

14 Claims, 6 Drawing Sheets

STYLUS FUNCTIONING AS JOYSTICK AND ELECTRONIC DEVICE UTILIZING THE SAME

BACKGROUND

1. Technical Field

The present disclosure generally relates to electronic device input, and particularly to a stylus used with electronic devices, and an electronic device utilizing the stylus.

2. Description of Related Art

Portable electronic devices, such as palm-top computers, hand-held computers, laptop computers, mobile phones and personal digital assistants (PDAs), have become increasingly popular. Many of these portable electronic devices include a stylus or touch pen which can be used to input information into the electronic device and/or select menu options or otherwise navigate through touch-based interface of an operating system or application.

A typical portable electronic device includes a main body and a stylus. The main body includes a direction controller rotatably disposed therein. The direction controller defines a connecting slot therein. An end of the stylus can be inserted in the connecting slot for use as a joystick. Thus, when users play a game, the stylus can conveniently control the game. However, the portable electronic device must have a direction controller matching the stylus, by way of which the device cost may be increased.

Therefore, there is room for improvement within the art.

BRIEF DESCRIPTION OF THE DRAWINGS

Many aspects of the stylus and electronic device can be better understood with reference to the following drawings. The components in the drawings are not necessarily to scale, the emphasis instead being placed upon clearly illustrating the stylus and electronic device. Moreover, in the drawings, like reference numerals designate corresponding parts throughout the several views.

DETAILED DESCRIPTION

Figure 1:
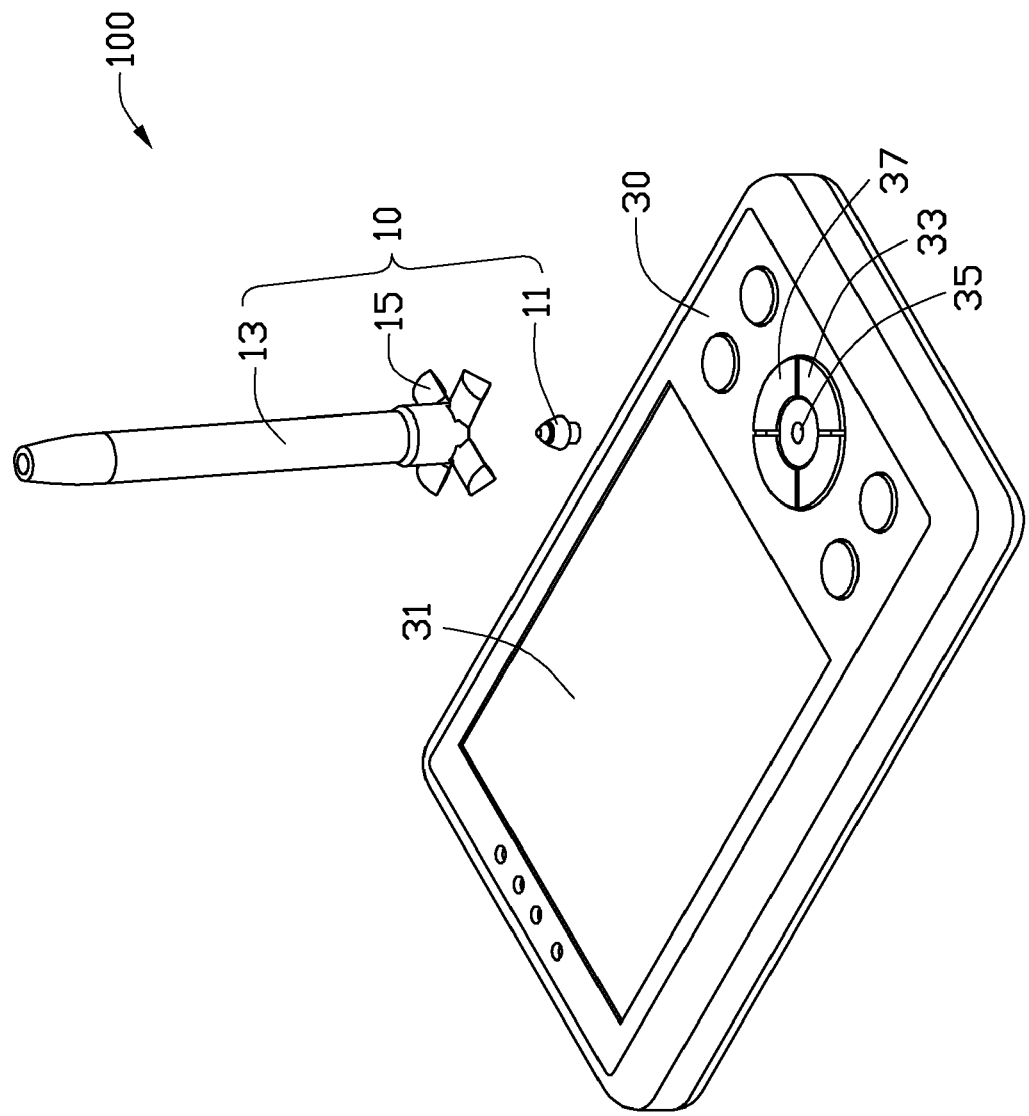
FIG. 1 is a partially exploded, isometric view of an exemplary electronic device.
Figure 2:
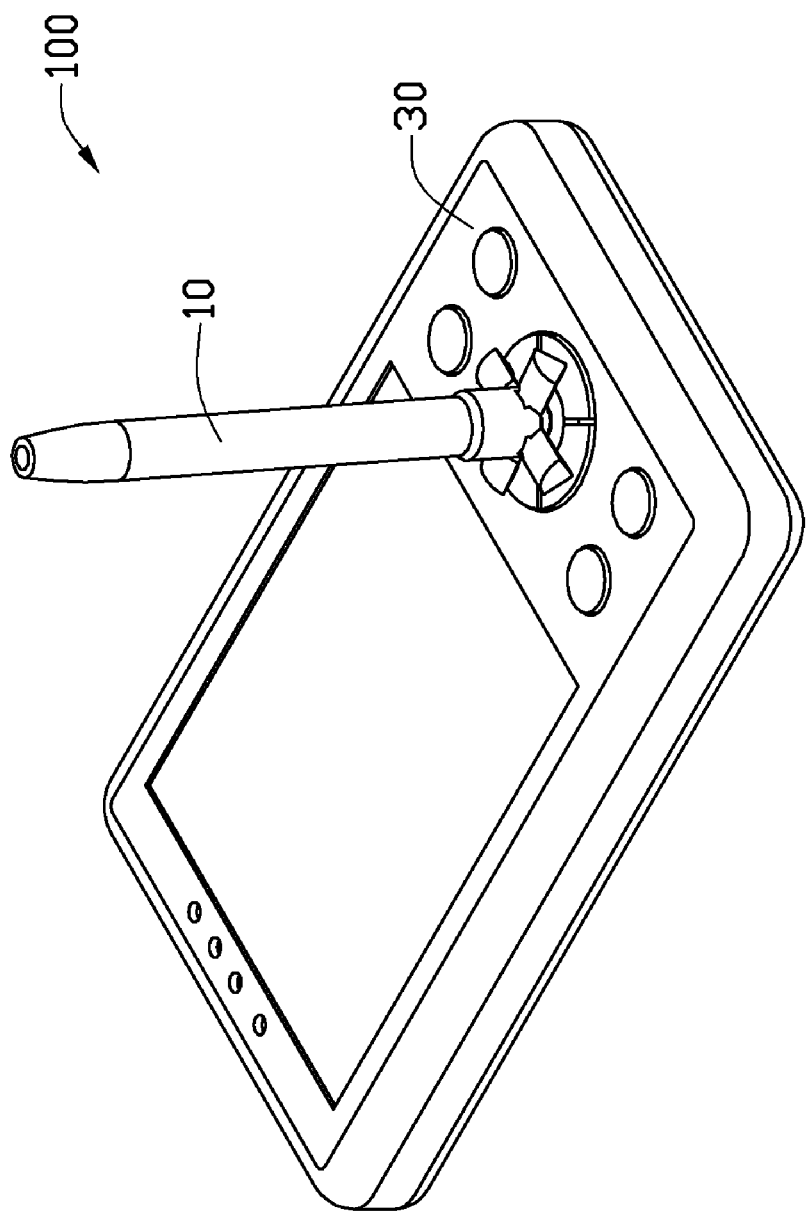
FIG. 2 is an isometric view of an exemplary stylus seated on a main body of an electronic device.

FIGS. 1 and 2 show an exemplary electronic device 100, such as mobile phone, personal digital assistant, and an exemplary stylus 10 and a main body 30. A display screen 31 and a navigation key 33 are disposed on the main body 30. The stylus 10 can be seated on the navigation key 33 for controlling games.

Figure 3:
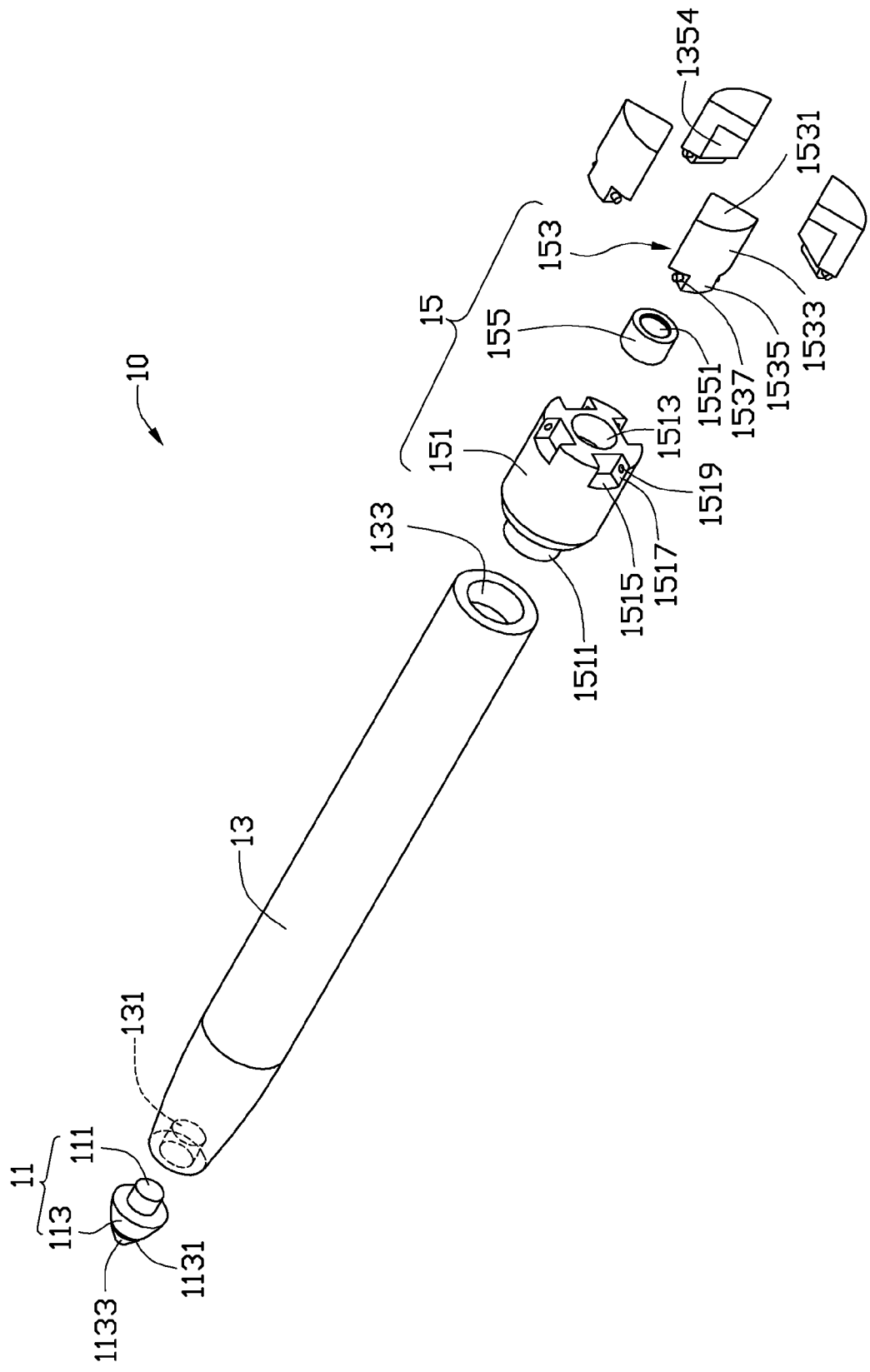
FIG. 3 is an exploded, isometric view of the stylus of FIG. 2.

Referring to FIG. 3, the stylus 10 includes a tip portion 11, a barrel 13, and a connecting assembly 15 at one end of the barrel 13. For information input to the electronic device 100, the tip portion 11 is attached to another end of the barrel 13 opposite to the connecting assembly 15 for touching the display screen 31. For joystick function, the tip portion 11 is attached to the connecting assembly 15 for seating the stylus 10 on the navigation key 33 as a joystick.

The tip portion 11 is resilient material, and includes a shaft 111 and a touch portion 113 connecting to the shaft 111. The shaft 111 is not only configured for connecting the tip portion 11 to the barrel 13, but also for connecting the tip portion 11 to the main body 30. The touch portion 113 is a cone including a top portion 1133. A ring-shaped recessed slot 1131 is defined adjacent to the top portion 1133. The recessed slot 1131 is configured for matching with the connecting assembly 15. The barrel 13 defines a first hole 131 and a second hole 133 at two ends thereof. The first hole 131 is configured for matching with the shaft 111. The second hole 133 is configured for connecting to the connecting assembly 15.

The connecting assembly 15 includes a main post 151, four resisting arms 153, and a connecting plug 155. The main post 151 includes a protrusion 1511 extending from an end thereof. The protrusion 1511 can be received in the second hole 133. A receiving slot 1513 is defined in an end of the main post 151 opposite to the protrusion 1511. The receiving slot 1513 is configured for receiving the connecting plug 155. Four assembly slots 1515 are defined in a peripheral wall of the main post 151. The assembly slots 1515 are spaced from each other and uniformly staggered. The resisting arms 153 are hinged to the assembly slots 1515 for rotating between open and closed positions. Each of the assembly slots 1515 includes two opposite sidewalls 1517 respectively defining a fixed hole 1519.

Figure 4:
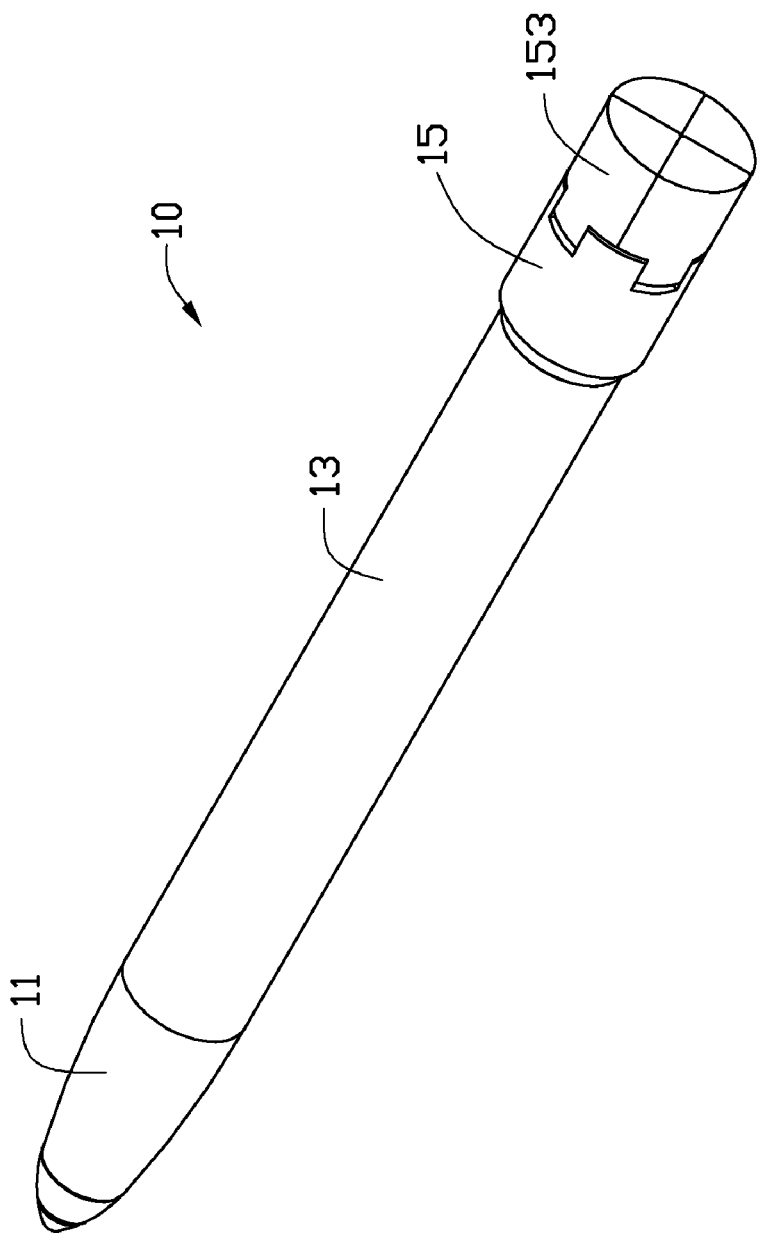
FIG. 4 is a seated, isometric view of the stylus of FIG. 3.
Figure 5:
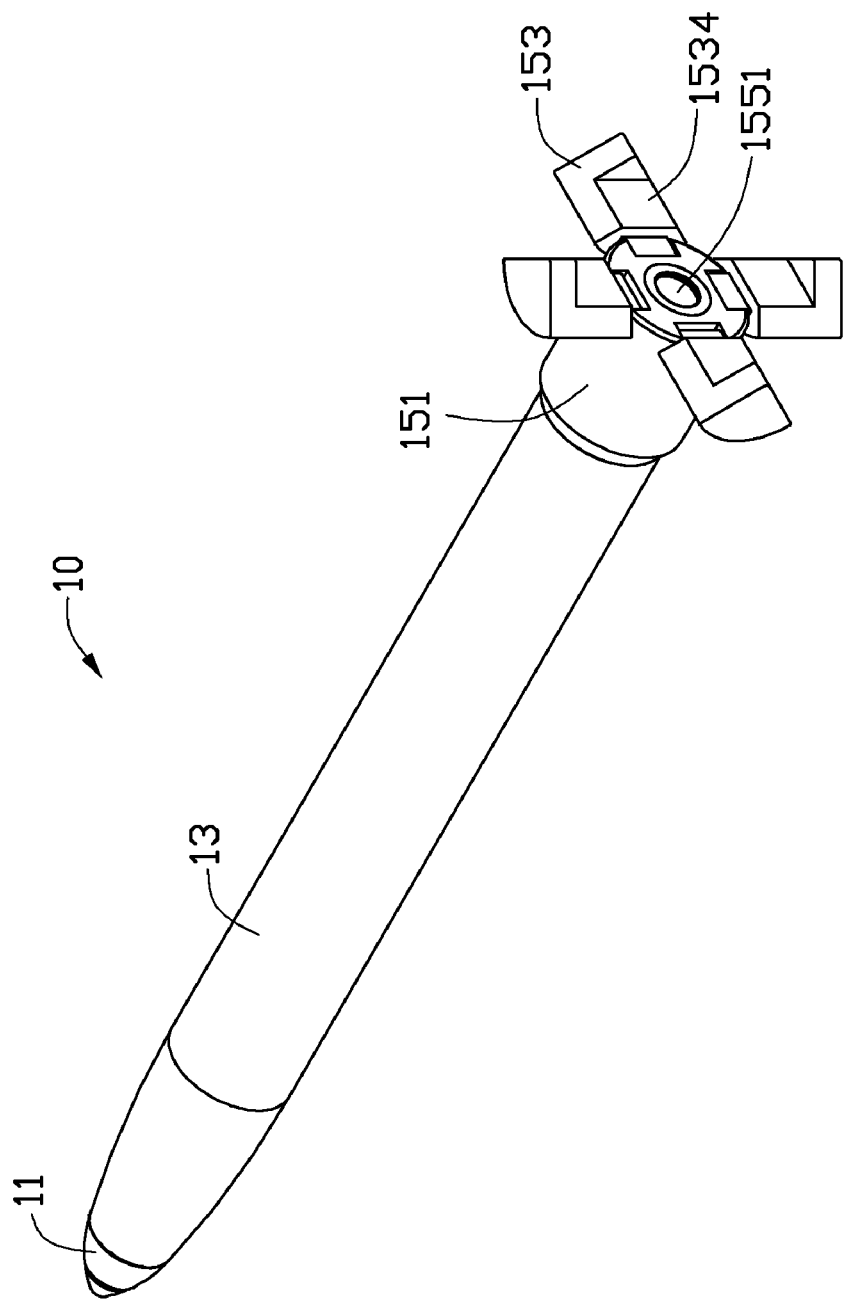
FIG. 5 is a seated, isometric view of the stylus of FIG. 3 in another state.
Figure 6:
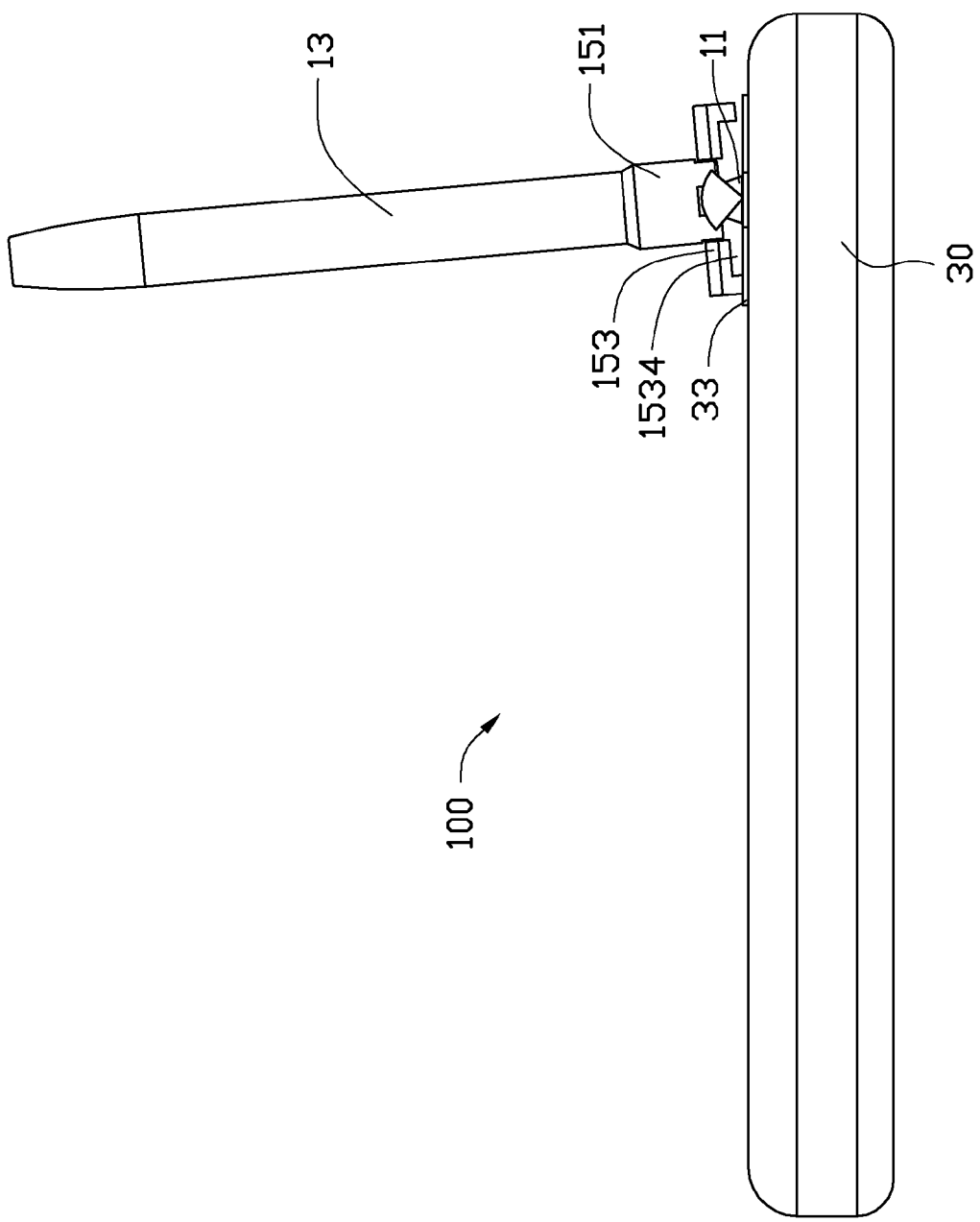
FIG. 6 is a side view of the electronic device of FIG. 1.

Referring to FIGS. 4 and 5, each of the resisting arms 153 includes a resisting portion 1531 and a side portion 1533 extending perpendicular from the resisting portion 1531, when the resisting arm 153 is in the open position. Thus, the resisting portion 1531 and the side portion 1533 cooperatively define a chamber 1534. The resisting portion 1531 is fan-shaped with a curved edge. The side portion 1533 extends from the curved edge. A connecting block 1535 extends from the side portion 1533 opposite to the resisting portion 1531. Two latching posts 1537 extend from two opposite sides of the connecting block 1535 to be received in the fixed hole 1519.

Referring to FIGS. 3 5, the connecting plug 155 is resilient material for being received in the receiving slot 1513. The connecting plug 155 defines a receiving slot 1551 for receiving the top portion 1133. The receiving slot 1551 is slightly larger than the top portion 1133, and the top portion 1133 can swing in the receiving slot 1551.

Referring to FIG. 1, the navigation key 33 includes four direction keys cooperatively surrounding a circular region 37 on the main body 30. A receiving hole 35 is defined in the circular region 37 for receiving the shaft 111.

Referring to FIGS. 3 4, during assembly, connecting plug 155 is received in the receiving slot 1513. Four resisting arms 153 are rotatably seated in the assembly slots 1515. The protrusion 1511 is received in the second hole 133 and shaft 111 in the first hole 131.

Referring to FIG. 2, when the stylus 10 is used as a joystick, the tip portion 11 is detached from the barrel 13, and the shaft 111 is received in the receiving hole 35. Resisting arms 153 are rotated about 90° to the open position to form a cross shape. Thus, the connecting plug 155 is exposed from the resisting arms 153. The top portion 1133 is received in the receiving slot 1551. The navigation key 33 is received in the chamber 1534 and latched by the resisting arms 153. Thus, the stylus 10 is seated on the navigation key 33.

Referring to FIG. 3 and FIG. 7, when used as a joystick, the stylus 10 moves in different directions whereby one of the resisting arms 153 contacts the navigation key 33, allowing full joystick control of a cursor to move in the display screen 31. The barrel 13 can also be detached from the main post 151 when the stylus 10 used as the joystick.

The connecting assembly 15 can be connected to the main body 30 by the tip portion 11, and the resisting arms 153 engage the navigation key 33. When stylus 10 is moved, one of the resisting arms 153 contacts a corresponding navigation key 33 providing control of the application. Thus, stylus 10 provides two functions, with no need for a dedicated direction controller, such as a scroll ball.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A stylus for an electronic device, the stylus comprising:
    a barrel;
    a connecting assembly at an end of the barrel, the connecting assembly comprising a connecting plug, a main post and four resisting arms, the main post connecting to the barrel, the resisting arms rotatably fixed to the main post for shielding the connecting plug; and
    a tip portion detached from one end of the barrel, the resisting arms rotated to an open position to form a cross shape, the connecting plug exposed from the resisting arms to receive the tip portion for functioning a joystick.

2. The stylus as claimed in claim 1, wherein the tip portion comprises a touch portion and a shaft, and the barrel defines a first hole at an end thereof in which the shaft is detachably received, the barrel further defines a second hole at the other end thereof in which the main post is received, the touch portion defines a ring-shaped recessed slot for engaging with the connecting plug.

3. The stylus as claimed in claim 2, wherein the main post comprises a protrusion extending from an end thereof, and a receiving slot defined another end opposite to the protrusion, the protrusion is received in the second hole, and the connecting plug is received in the receiving slot.

4. The stylus as claimed in claim 3, wherein a peripheral wall of the main post defines four assembly slots uniformly spaced from each other, in each of which one end of a corresponding resisting arm is rotatably received, the resisting arms are rotated about 90 degrees to the opening position.

5. A stylus for an electronic device, the electronic device comprising a navigation key, the stylus comprising:
    a barrel;
    a tip portion detachably seated to an end of the barrel; and
    a connecting assembly comprising a main post and four resisting arms, the main post connected to the other end of the barrel and the resisting arms rotatably attached to the main post;
    wherein when the stylus is used as a joystick, the resisting arms are rotated to abut the navigation key, and the tip portion is removed from the end of the barrel and attached to the main post for connecting to the electronic device.

6. The stylus as claimed in claim 5, wherein the main post defines a receiving slot in which a connecting plug is received and the tip portion seated.

7. The stylus as claimed in claim 6, wherein a peripheral wall of the main post defines four uniformly spaced, assembly slots in each of which is rotatably received an end of a corresponding resisting arm.

8. The stylus as claimed in claim 7, wherein each of the resisting arms defines a chamber for receiving the navigation key.

9. An electronic device, comprising:
    a main body comprising a navigation key disposed thereon;
    a stylus comprising:
        a barrel;
        a tip portion detachably attached to an end of the barrel; and
        a connecting assembly comprising a main post and four resisting arms, the main post connected to the other end of the barrel, the resisting arms rotatably attached to the main post;
    wherein when the stylus is used as a joystick, the resisting arms are rotated to abut the navigation key, and the tip portion is removed from the end of the barrel and attached to the main post for connecting to the electronic device.

10. The electronic device as claimed in claim 9, wherein the tip portion comprises a shaft and the barrel defines a first hole at an end thereof in which the shaft is detachably seated.

11. The electronic device as claimed in claim 9, wherein the barrel further defines a second hole at the other end thereof, in which the main post is seated.

12. The electronic device as claimed in claim 9, wherein the main post comprises a protrusion extending from an end thereof, the protrusion received in the second hole.

13. The electronic device as claimed in claim 9, wherein the main post defines a receiving slot, and the connecting assembly further comprises a connecting plug received in the receiving slot.

14. The electronic device as claimed in claim 9, wherein a peripheral wall of the main post defines four assembly slots uniformly spaced from each other, in each of which an end of a corresponding resisting arm is rotatably seated.

* * * * *